March 27, 1962 A. LUKAS ETAL 3,026,965
ELECTRIC FILTER
Filed Aug. 3, 1959 2 Sheets-Sheet 1

INVENTORS
Adam Lukas
Eduard Broft

BY Bailey, Stephens + Huettig
ATTORNEYS

United States Patent Office 3,026,965
Patented Mar. 27, 1962

3,026,965
ELECTRIC FILTER
Adam Lukas, Mannheim, and Eduard Broft, Frankfurt am Main, Germany, assignors to Motor-Condensator-Compagnie Schloz K.-G., Mannheim-Industriehafen, Germany
Filed Aug. 3, 1959, Ser. No. 831,410
Claims priority, application Germany Aug. 1, 1958
3 Claims. (Cl. 183—7)

This invention relates to an electrically insulating, pressure-tight sealing of the connecting passage for live parts of gas-filled electric apparatus, especially of electric filtering and/or flocculating devices. An object of said invention is to provide increased safety of operation in said apparatus, especially with regard to explosion hazards.

Insofar as such devices are being used in connection with electric filtering apparatus, they serve (1) to seal the chamber for the gas to be freed from dust and particles, against leaking of gas and against air entering the chamber, and (2) also to provide outside insulation for the high-tension grid suspended in the gas chamber. The conventional types of insulation consist of an oil-filled cup and of a bell immersed with its rim in the oil. The oil in the cup serves the purpose of pressure-tight sealing of the gas chamber, as well as of insulating the high-tension grid against the gas container. These conventional fixtures have a disadvantage because the oil tends to spill over from the cup under varying conditions of gas pressure, and gas may thus leak from the chamber or air may enter the chamber from the outside. Leaking gas constitutes a nuisance in the neighborhood of the plant, while air entering the chamber may present the hazard of explosive gas-air mixtures forming within the chamber. In both cases oil is spilled to the outside or to the inside. The oil level will sink accordingly, resulting in an impairment of the pressure level necessary for efficient sealing.

The purpose of this invention, now, is to further develop the sealing unit formed by the electrically insulated, pressure-tight sealing of the connecting passage for live parts of gas-filled electric apparatus, in such a way as to prevent variations in gas pressure reacting also on the oil level in connection with the gas chamber, from exerting any impairing influence on the oil level in the cup. In this invention, said purpose is attained mainly through a hood with its rims immersed in the container, and through an insulation piece connecting the rims of said hood with the container, said insulation piece being protected from contamination by the oil charge. This arrangement makes for a completely pressure-tight sealing between the gas chamber and the outside atmosphere. The oil charge is relieved of its former function of insulating and sealing, and now serves for the purpose only of protecting the insulation piece from contamination, the functions of sealing and insulating now being fulfilled by said insulation piece.

Whenever a gas containing dust, e.g. a gas with a considerable content of carbon black, is conducted through an electric filtering or flocculating apparatus for the purpose of partly eliminating and partly flocculating said carbon black, the fixed insulation piece would be covered very quickly by a layer of dust and/or carbon black, which layer would cancel out the insulating power of said piece within a very short time (a few hours or even less). This would cause the high tension to flash over within a short time. This flashover hazard is eliminated by the oil charge which prevents the formation of any de-insulating layer of particles on the insulation piece. Said flashover hazard is present with regard to any and all dust particles in any kind of material possessing conductivity or tending to become conductive through the influence of inevitable humidity. This is also the case with carbon black. While the fixed insulation piece thus serves the purpose of sealing and insulating, the oil charge has the function of protetcting the insulation piece from contamination and from thet hazard of flashovers, by keeping the same clean at all times. Without this oil charge surrounding the fixed insulation piece, this latter device would be inoperative. This applies not only to the inside part but also to the outside part of the insulation piece, even if that inside part must be regarded as more vulnerable because it would tend to become contaminated in much shorter time.

A special arrangement of the device described in this invention provides a fixed connection of the insulation piece with the container bottom. Preferably, also, the insulation piece may be designed to be in fixed connection with the outer wall of the container by means of a partition wall. In this latter case cleaning flaps may be provided in the outer wall of the container, above and below the partition walls. Preferably, again, this arrangement should include the container bottom being designed in a conical shape, sloping from the bottom center towards the rim. Finally, one or several circulation pumps may be provided for the oil in the inner or outer container chambers or in both container chambers, said pumps being equipped with a purifying device.

The drawing shows two samples of such insulating and sealing devices pursuant to this invention, both in connection with an electric filtering apparatus.

Figure 1:
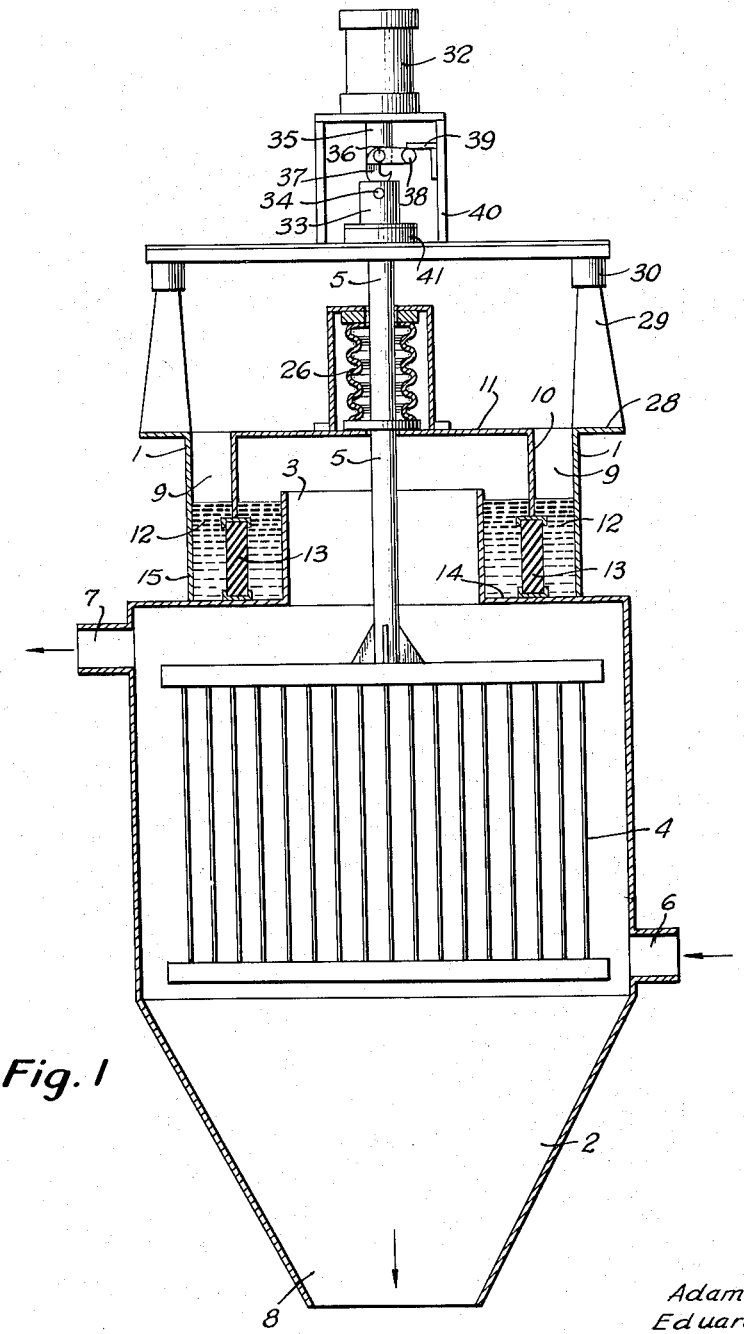
FIG. 1 is a longitudinal section through the electric filter.

The electric filtering device consists of the casing 1 surrounding the gas chamber 2. The upper part of the filter has a passage 3. The grid 4 under high tension is suspended in the gas chamber 2. Grid 4 is kept in position by the rod 5 which runs through passage 3. The cylindrical part of gas chamber 2 has a gas entry 6 below and a gas exit 7 on the opposite side. The exit for material eliminated from the gas, e.g. carbon black 8 is provided in the under part of the conical section of casing 2 which is annexed to the cylindrical part. Passage 3 is surrounded by the annular, oil-filled container 9 into which the rims 10 of a hood 11 are immersed. The rims 10 of the hood 11 are in fixed connection with the container 9 through an insulation piece 13 which latter is protected against contamination through the oil charge 12, the insulation piece is also of annular shape.

Figure 2:
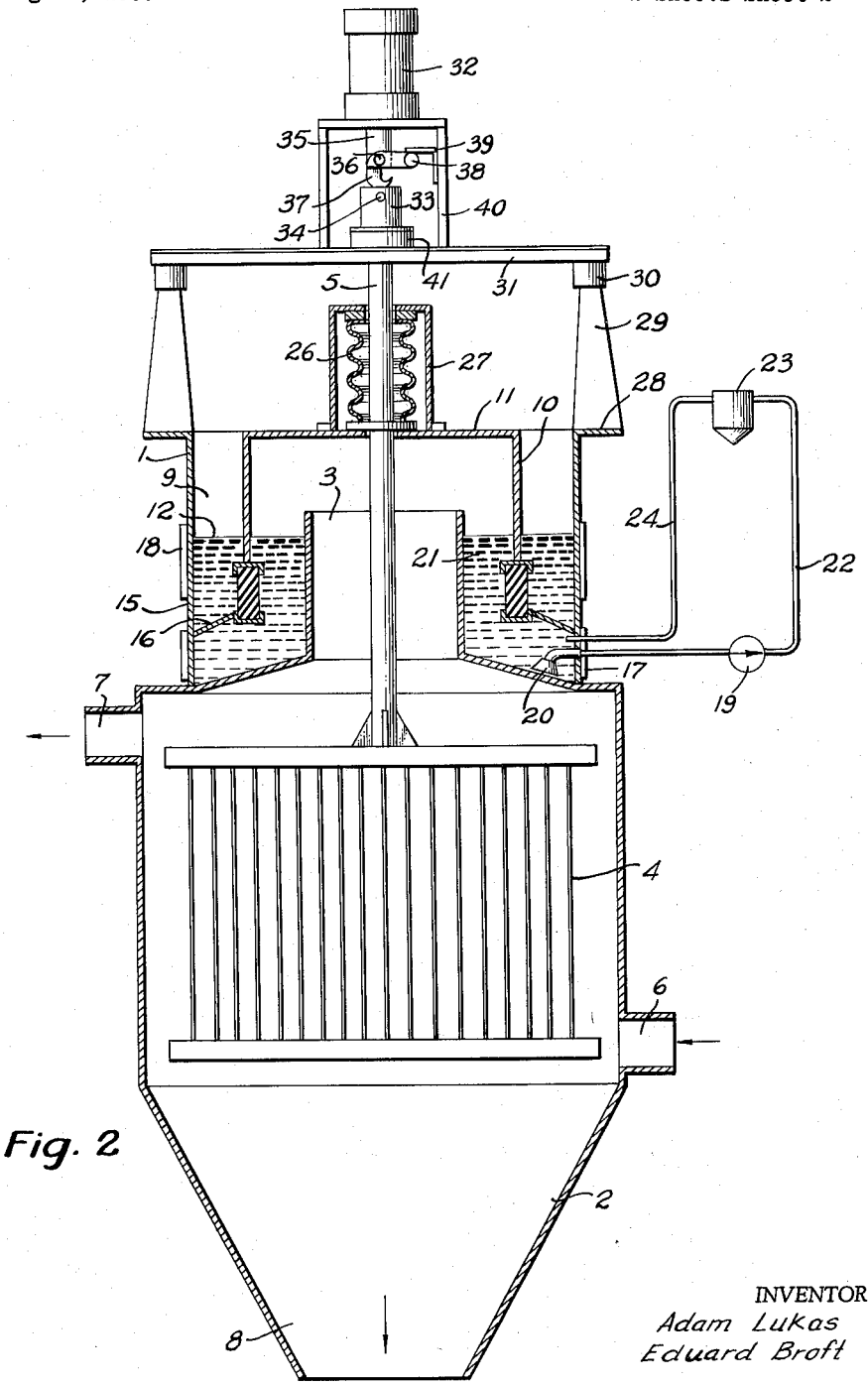
FIG. 2 shows a similar longitudinal section of a modified sample of the arrangement shown in FIG. 1.

In the sample shown in FIG. 1, the insulation piece 13 is in fixed connection with the bottom 14 of the container 9, while in the sample shown in FIG. 2, the insulation piece 13 is in fixed connection with the outer wall 15 of the container 9 through a partition wall 16. The insulation piece 13 which has a closed cylindrical surface same as container 9, subdivides said container 9 into two separate, oil-filled chambers without any connection between those two chambers.

The sample in FIG. 2 also shows cleaning flaps 18 provided in the outer wall of container 9 below 16 and above 17 the partition wall. Another feature shown in FIG. 2 is a circulation pump 19 which suctions the oil from the inner chamber 21 through the suctioning passage 20 and through the conduit 22 into a purifying device 23, and then through the conduit 24 back into the inner chamber 21. An identical or similar purifying device may be installed for the outer chamber 25.

Rod 5 supporting grid 4 and passing through passage 3 is also conducted through hood 11. A bellows expansion joint 26 of metal in a casing 27 is installed on top of hood 11; the lower end of the expansion joint 26 is fixed to rod 5 while the upper end is fixed to casing 27. In this manner, bellows expansion joint 26 provides complete sealing of the inner chamber of hood 11 and likewise of the entire inside of casing 1 against the space outside hood 11 which is in connection with the outside atmosphere; rod 5 in this arrangement being movable in an upward and downward direction. The upper ends of casing 1 are bent off. These bent, or beveled edges 28 carry insulators 29 in a spaced arrangement; these insulators, again, carry shock-absorbing elements 30, e.g. of rubber, for supporting the frame 31. A lifting cylinder 32 with up-and downgoing piston is mounted on frame 31.

The upper end of rod 5 has a forked holding fixture 33 into which a ball bearing 34 is inserted. The lower end of the piston rod 35 of the piston in lifting cylinder 32 also has a forked shape; it carries a hook 37 which pivots on a horizontal stud 36. Whenever the lifting piston is going down and hook 37 hits ball bearing 34, hook 37 will pivot and will clinch below ball bearing 34. Thus a connection is estabished between the lifting piston and rod 5. If the lifting piston then begins its upward movement, rod 5 and also grid 4 are carried upwards with it. The upper end of hook 37 is bent off toward the outside and carries a pulley 38 which hits a stop 39 when the lifting piston moves upward. This causes hook 37 to pivot on its bearing stud 36 and to release its clinch; ball bearing 34 comes free, and rod 5 with grid 4 falls down. This carrying upwards of rod 5 and grid 4 with subsequent dropping of grid 4 establishes a continuous shaking action which knocks the particles off the wires of grid 4. Lifting cylinder 32 is mounted on frame 40 which, in turn, is supported by frame 31. Stop 39 is mounted laterally to frame 40. Frame 31 also supports a bearing 41 through which the upper end of rod 5 is carried.

We claim:

1. In an electric filter having a casing containing a grid, a rod joined to said grid, and extending through the top side of the casing, an oil container on the top of the casing and surrounding said rod, and a hood having its rim immersed in said oil container, the improvement comprising an annular insulation piece seated in said oil container and supportingly engaging the rim of said hood, said insulation piece being fully immersed in oil for protection against contamination.

2. In an electric filter as in claim 1, further comprising a partition wall in said oil container for separating said oil container into two oil-filled chambers, and said insulation piece being seated upon said partition wall.

3. In an electric filter as in claim 1, said insulation piece being seated upon the bottom of said oil container.

References Cited in the file of this patent

UNITED STATES PATENTS

| 1,491,274 | Rathbun | Apr. 22, 1924 |
| 1,806,854 | Hesson | May 26, 1931 |
| 2,215,267 | Hedberg et al. | Sept. 17, 1940 |

FOREIGN PATENTS

| 36,379 | Norway | Dec. 18, 1922 |
| 295,890 | Great Britain | Aug. 23, 1928 |
| 419,610 | Great Britain | Nov. 15, 1934 |